United States Patent [19]

Ohkubo et al.

[11] Patent Number: 5,327,336
[45] Date of Patent: Jul. 5, 1994

[54] CONSTANT VOLTAGE CONSTANT FREQUENCY INVERTER AND METHOD FOR CONTROLLING THE SAME

[75] Inventors: Hidenori Ohkubo; Tetsuo Yasuda; Kazuhisa Manabe, all of Kawasaki, Japan

[73] Assignee: Fuji Electric Co., Ltd., Kawasaki, Japan

[21] Appl. No.: 997,705

[22] Filed: Jan. 5, 1993

[30] Foreign Application Priority Data

Jan. 8, 1992 [JP] Japan ............................. 4-1759

[51] Int. Cl.[5] .............................................. H02M 3/24
[52] U.S. Cl. .......................................... 363/97; 363/35
[58] Field of Search ................... 363/35, 37, 95, 97, 363/98, 131, 132, 135, 136

[56] References Cited

U.S. PATENT DOCUMENTS

| | | | |
|---|---|---|---|
| 4,488,200 | 12/1984 | Matsuzaki | 361/104 |
| 4,677,535 | 6/1987 | Kawabata et al. | 363/65 |
| 4,816,981 | 3/1989 | Nishihiro et al. | 363/37 |
| 5,121,315 | 7/1992 | Moriya | 363/98 |

FOREIGN PATENT DOCUMENTS

| | | | |
|---|---|---|---|
| 4023207 | 4/1991 | Fed. Rep. of Germany | 363/97 |
| 63-121474 | 5/1988 | Japan | 363/97 |
| 2175155 | 11/1986 | United Kingdom | 363/97 |

OTHER PUBLICATIONS

Takao Kawabata, "Parallel Operation of Voltage Source Inverters," IEEE Transactions on Industry Applications, vol. 24, No. 2 (Mar./Apr., 1988), pp. 281-287.

Primary Examiner—Steven L. Stephan
Assistant Examiner—Matthew Nguyen
Attorney, Agent, or Firm—Spencer, Frank & Schneider

[57] ABSTRACT

A CVCF (Constant Voltage Constant Frequency) inverter includes a main circuit, a voltage control loop, and a frequency control loop. In a normal operating mode, constant voltage, constant frequency control is carried out by these loops. In a lap switching operation, if a comparator detects that the output current of the inverter exceeds a predetermined level, a switch is closed so that the effective power component computed by an effective power computing unit is inputted to the frequency control loop. The output frequency of the inverter is controlled by changing a reference frequency in response to the effective power. This reduces the phase difference between the output voltage of the inverter and an external power supply, thus decreasing a cross current. This makes it possible to protect the components of the inverter and to supply power reliably.

16 Claims, 6 Drawing Sheets

CONSTANT VOLTAGE CONSTANT FREQUENCY INVERTER AND METHOD FOR CONTROLLING THE SAME

BACKGROUND OF THE INVENTION

1. Field of the Invention

The present invention relates to a CVCF (Constant Voltage Constant Frequency) inverter and to a method for controlling the same, and particularly to a CVCF inverter employed in carrying out lap switching with a rotating type power generator.

2. Description of the Prior Art

In a large aircraft in flight, for example, electric power is supplied from a rotating type power generator which is driven by an engine. While on land, on the other hand, the power supply is switched from the power generator on the aircraft to a power supply installed at an airport. In this case, uninterruptible power switching is required because of computers installed in the aircraft. A CVCF inverter is generally used with the power supply installed at the airport.

FIG. 1 shows a conventional power supply system of this type. In FIG. 1, reference numeral 30 designates a rotating type power generator (MG) on the aircraft; 40 designates a CVCF inverter (CVCF); 50 designates apparatuses (loads) on the aircraft to which the power is to be supplied; SW1 and SW2 designates switches; ΔI designates a cross current; and IL designates a load current. The switch SW1 is closed in flight so that the power is supplied from the power generator 30 to the loads 50. After landing, uninterruptible switching is carried out by first closing the switch SW2 so that both switches SW1 and SW2 are closed for a while, and then, by opening the switch SW1 so that the loads 50 are supplied with the power from the CVCF inverter 40 via the switch SW2. Thus, the lap switching operation is performed.

The lap switching operation, however, may sometimes cause a cross current ΔI due to a difference in phases of the voltages supplied from the power generator 30 and the CVCF inverter 40. More specifically, assuming that the output voltage and the output impedance of the CVCF inverter 40 are Asinωt and Z1, and those of the power generator 30 are Asin(ωt+θ) and Z2, a cross current ΔI expressed by equation (1) flows from the power generator 30 to the CVCF inverter 40.

$$\Delta I = A\{\sin(\omega t+\theta) - \sin\omega t\}/(Z1+Z2)$$
$$= 2A\cos(\omega t+\theta/2)\sin(\theta/2)/(Z1+Z2) \quad (1)$$

Thus, the magnitude of the cross current ΔI is directly proportional to the phase difference θ as long as θ is rather small.

Although the cross current presents little problem as long as the phase difference θ is small, a large phase difference will result in a large current flowing from the power generator 30 to the CVCF inverter 40 or from the CVCF inverter 40 to the power generator 30. For example, when the phase of the power generator 30 leads that of the CVCF inverter 40, the cross current flows from the power generator 30 to the CVCF inverter 40 so that the DC voltage of the CVCF inverter 40 rises, which might cause damage to devices in the inverter in the worst case.

On the other hand, when the phase of the CVCF inverter 40 leads that of the power generator 30, the cross current flows from the CVCF inverter 40 to the power generator 30. In this case, if the output current of the CVCF inverter 40 exceeds a limiting level of an overcurrent, automatic control to limit the output voltage of the CVCF inverter 40 is carried out to protect the inverter 40 from damage. This creates another problem in that sufficient power is not supplied because of the voltage drop at the loads.

SUMMARY OF THE INVENTION

It is, therefore, an object of the present invention to provide a CVCF inverter and method for controlling the same, which protect the inverter by reducing the cross current and which permit the inverter to supply power in a stable and reliable manner.

In a first aspect of the present invention, there is provided a CVCF inverter comprising:

a main circuit for converting a DC input voltage to an AC output voltage;

voltage control means for controlling the output voltage of the main circuit;

frequency control means for controlling a frequency of the output voltage of the main circuit so that the frequency is maintained at a reference frequency;

detecting means for detecting a cross current flowing through the main circuit; and adjusting means for adjusting the reference frequency in accordance with a detected result of the detecting means.

The detecting means may comprise means for detecting the output voltage of the main circuit, means for detecting an output current of the main circuit, and effective power computing means for computing effective power outputted from or inputted to the main circuit based on the output voltage and the output current of the main circuit, wherein the adjusting means increases the reference frequency when the effective power is flowing into the main circuit and decreases the reference frequency when the effective power is flowing out of the main circuit.

The adjusting means may further comprise comparing means for comparing the output current of the main circuit with a predetermined value, and may change the reference frequency in accordance with the magnitude of the effective power when the output current of the main circuit exceeds the predetermined value.

The adjusting means may comprise a V/F adjuster producing a voltage in accordance with the effective power, and the frequency control means may comprise a V/F oscillator changing its oscillating frequency in response to the voltage outputted from the V/F adjuster.

The adjusting means may further comprise a filter for filtering the output of the V/F adjuster, and a summing point for producing a difference between the output of the filter and the effective power and for supplying the difference to the V/F adjuster.

The detecting means may comprise means for detecting the DC voltage inputted to the main circuit, and the adjusting means may comprise comparing means for comparing the detected DC voltage with a predetermined value, and a voltage adjuster controlling the frequency control means so that the reference frequency is increased by an amount corresponding to the difference between the detected DC voltage and the predetermined value when the detected DC voltage exceeds the predetermined value.

The detecting means may further comprise means for detecting the output voltage of the main circuit, means for detecting an output current of the main circuit, and effective power computing means for computing effective power outputted from or inputted to the main circuit based on the output voltage and the output current of the main circuit, wherein the adjusting means adjusts the reference frequency, when the detected DC voltage is less than the predetermined value, in such a manner that the reference frequency is decreased when the effective power is flowing out of the main circuit and is increased when the effective power is flowing into the main circuit.

The adjusting means may further comprise comparing means for comparing the output current of the main circuit with a predetermined value, and may control the frequency control means so that the reference frequency is changed in accordance with the magnitude of the effective power when the output current of the main circuit exceeds the predetermined value.

The adjusting means may comprise a V/F adjuster producing a voltage in accordance with the effective power, and the frequency control means may comprise a V/F oscillator changing its oscillating frequency in response to the voltage outputted from the V/F adjuster.

The adjusting means may further comprise a filter for filtering the output of the V/F adjuster, and a summing point for producing a difference between the output of the filter and the effective power and supplying the difference to the V/F adjuster.

In a second aspect of the present invention, there is provided a method for controlling a CVCF inverter having a main circuit for converting a DC input voltage to an AC output voltage, the method comprising the steps of:

controlling a frequency of the output voltage of the main circuit so that the frequency is maintained at a reference frequency;

detecting a cross current flowing through the main circuit; and adjusting the reference frequency in accordance with a detected result.

The step of detecting may comprise the steps of detecting the output voltage of the main circuit, detecting an output current of the main circuit, and computing effective power outputted from or inputted to the main circuit based on the output voltage and the output current of the main circuit, and the step of adjusting may comprise the steps of increasing the reference frequency when the effective power is flowing into the main circuit and decreasing the reference frequency when the effective power is flowing out of the main circuit.

The step of adjusting may comprise the steps of comparing the output current of the main circuit with a predetermined value, and adjusting the reference frequency in accordance with the magnitude of the effective power when the output current of the main circuit exceeds the predetermined value.

The step of adjusting may comprise the step of producing a voltage in accordance with the effective power, and the step of controlling may comprise the step of changing the frequency of the output voltage of the main circuit in response to the voltage.

The step of detecting may comprise the step of detecting the DC voltage inputted to the main circuit, and the step of adjusting may comprise the steps of comparing the detected DC voltage with a predetermined value, and increasing the reference frequency by an amount corresponding to the difference between the detected DC voltage and the predetermined value when the detected DC voltage exceeds the predetermined value.

The step of detecting may comprise the steps of detecting the output voltage of the main circuit, detecting an output current of the main circuit, and computing effective power outputted from or inputted to the main circuit based on the output voltage and the output current of the main circuit, wherein the step of adjusting comprises the step of adjusting the reference frequency, when the detected DC voltage is less than the predetermined value, in such a manner that the reference frequency is decreased when the effective power is flowing out of the main circuit, and is increased when the effective power is flowing into the main circuit.

The step of adjusting may comprise the steps of comparing the output current of the main circuit with a predetermined value, and controlling the reference frequency in accordance with the magnitude of the effective power when the output current of the main circuit exceeds the predetermined value.

The step of adjusting may comprise the step of producing a voltage in accordance with the effective power, and the step of controlling may comprise the step of changing the frequency of the output voltage of the main circuit in response to the voltage.

According to the present invention, the output frequency of the inverter is decreased when the inverter supplies power to an external power supply, and is increased when the inverter receives power from the external power supply. By this, the cross current between the inverter and the external power supply can be reduced. This makes it possible to prevent damage of the components of the inverter, and the voltage drop at the output of the inverter.

In addition, when the DC voltage across a capacitor at the DC side of the inverter exceeds a predetermined value, the output frequency of the inverter is increased so that the effective power is supplied from the inverter to the external power supply, and hence, the DC voltage across the capacitor is reduced. This also makes it possible to protect the components of the inverter.

Furthermore, a combination of the above mentioned two techniques will ensure a more reliable and safe operation.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

Figure 1:
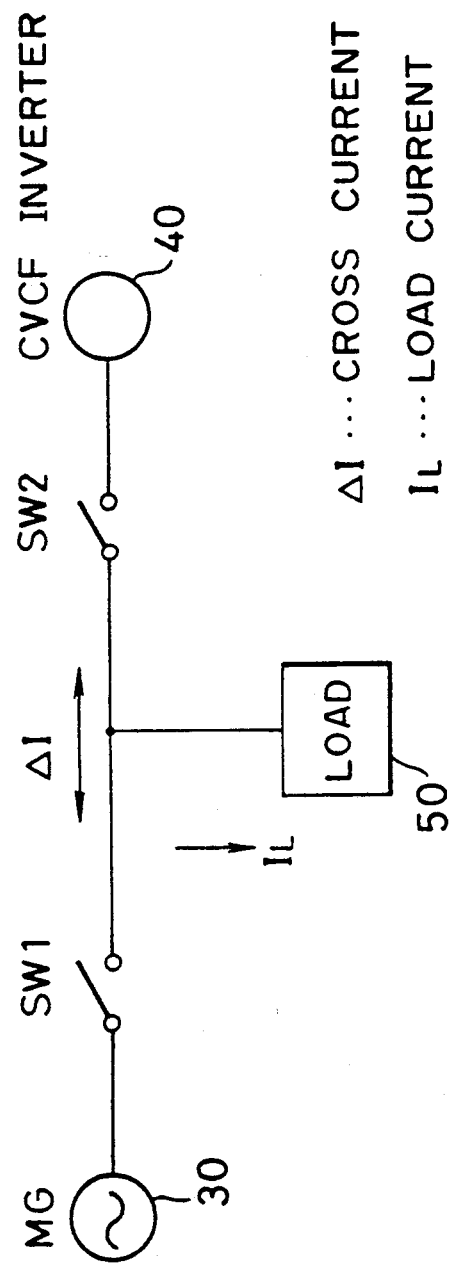
FIG. 1 is a schematic diagram illustrating a lap switching operation of a conventional uninterruptible power switching system.
Figure 2:
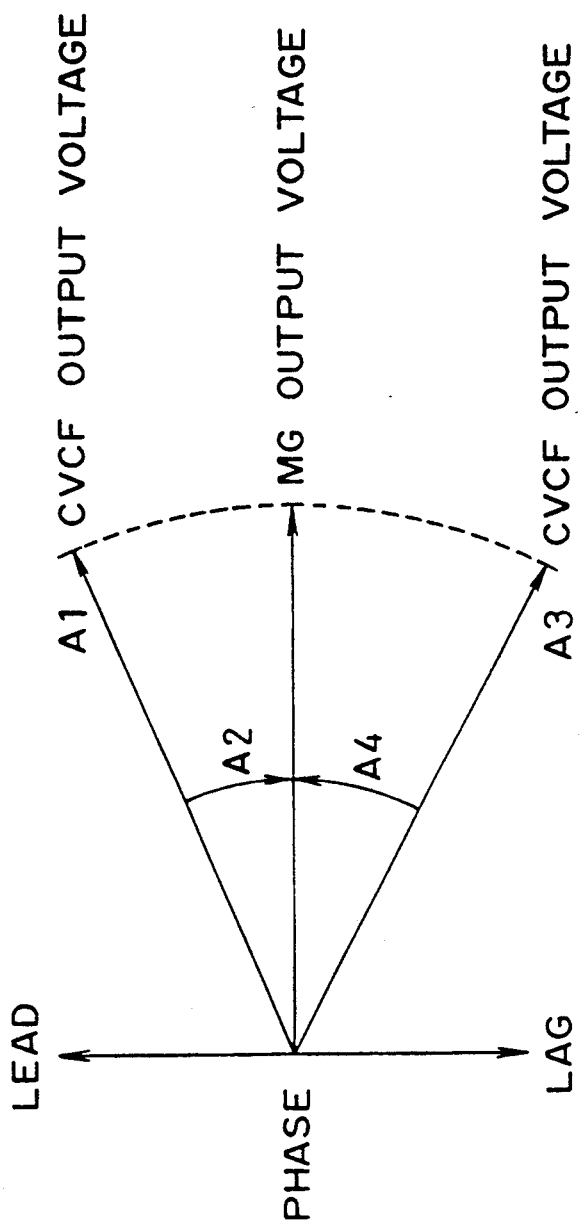
FIG. 2 is a vector diagram explaining the principle of the present invention.
Figure 3:
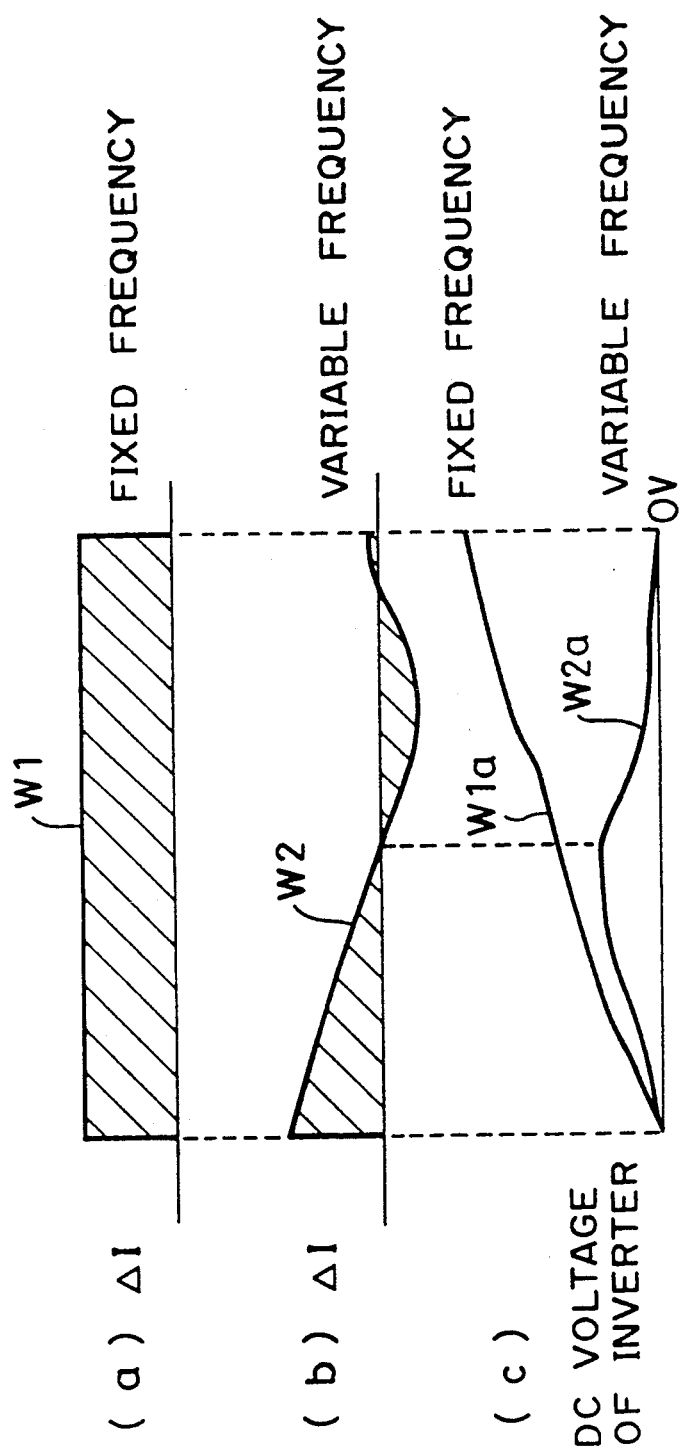
FIG. 3 is a diagram illustrating waveforms W2 and W2a of a cross current ΔI and the DC voltage of an inverter in accordance with the present invention in comparison with those W1 and W1a of a conventional inverter.

Before describing embodiments, let us explain the principle of the present invention with reference to FIGS. 2 and 3.

Figure 4:
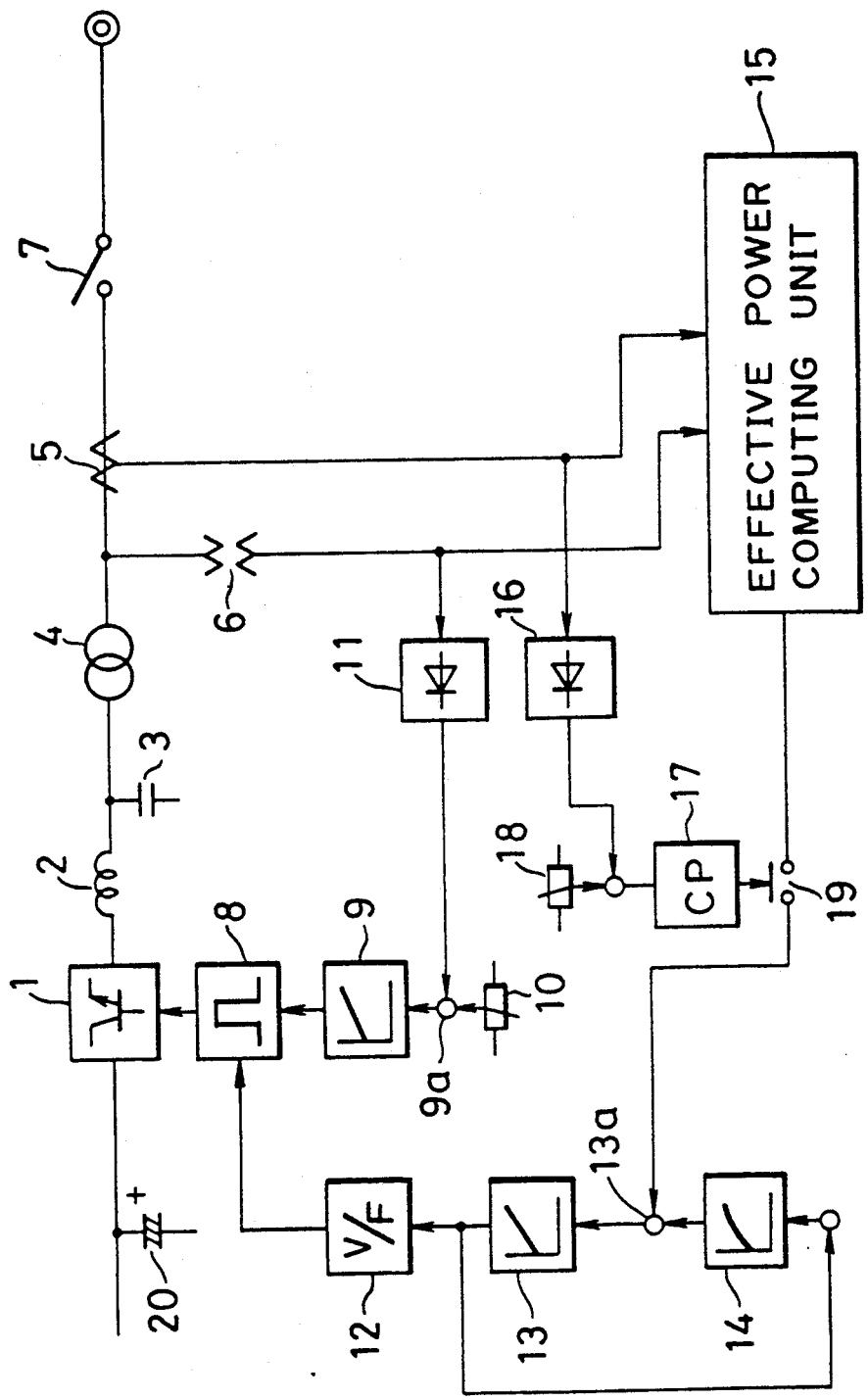
FIG. 4 is a block diagram showing the arrangement of a first embodiment of a CVCF inverter in accordance with the present invention.

When the phase of the output voltage of the CVCF (Constant Voltage Constant Frequency) inverter 40 leads that of the power generator (MG) 30 as indicated by the arrow A1 of FIG. 2 in an arrangement as shown in FIG. 4, the output frequency of the CVCF inverter 40 is reduced as indicated by the arrow A2 in FIG. 2. On the other hand, when the phase of the output voltage of the CVCF inverter 40 lags behind that of the power generator 30 as indicated by the arrow A3 of FIG. 2, the output frequency of the CVCF inverter 40 is increased as indicated by the arrow A4 so that the phase difference is shrunk. By this control in which the frequency of the inverter is varied, the cross current $\Delta I$ flowing between the power generator and the CVCF inverter is gradually reduced as shown at (b) of FIG. 3.

In FIG. 3, (a) illustrates the waveform W1 of the cross current $\Delta I$ when this control is not carried out, that is, when the frequency is fixed during the lap switching operation. In this case, since the phase difference $\theta$ of equation (1) is kept constant, the magnitude of the cross current $\Delta I$ is also kept constant.

On the other hand, when the frequency of the output voltage of the CVCF inverter 40 is controlled as described above, the magnitude of the cross current $\Delta I$ varies as shown at (b) of FIG. 3 so that the cross current $\Delta I$ is reduced.

The magnitude of the cross current $\Delta I$ can be detected in terms of the effective power of the inverter 40. More specifically, assuming that the effective power is $\Delta P$, and the phase difference between the output voltage of the inverter 40 and the cross current $\Delta I$ is $\phi$, the following equation holds.

$$\Delta P = K \times \Delta I \times \cos\phi \quad (2)$$

where K is a fixed coefficient. Thus, by making the effective power zero, the cross current $\Delta I$ also becomes zero as long as $\cos\phi$ is not zero, which usually holds.

The effective power can be detected not only by directly detecting it at the output side of the inverter, but also by indirectly detecting it in terms of the DC voltage at the input side of the inverter. When the effective power pours into the inverter 40 from the power generator 30, the increase $\Delta V$ in the DC voltage of the inverter is expressed as an integral of the effective power. Thus, the following equation is obtained.

$$\Delta V = \int \Delta P \, dt \quad (3)$$

Accordingly, constant effective power will linearly increase the DC voltage of the inverter. In FIG. 3, (c) illustrates the waveforms of the DC voltages of the inverter, wherein the waveform W1a corresponds to the fixed frequency shown in (a) of FIG. 3, and the waveform W2a corresponds to the variable frequency shown in (b) of FIG. 3.

EMBODIMENT 1

FIG. 4 is a block diagram showing a first embodiment of a CVCF inverter in accordance with the present invention.

In this figure, reference numeral 1 denotes the main circuit of the inverter; 2 denotes an AC reactor; 3 denotes a capacitor; 4 denotes a transformer; 5 denotes a current transformer (CT); 6 denotes a potential transformer (PT); 7 denotes an output contactor; 8 denotes a pulse distributor; 9 denotes a voltage adjuster; 9a denotes a summing point; 10 denotes a voltage setting unit; 11 and 16 denotes AC/DC converters; 12 denotes a V/F (Voltage/Frequency) oscillator; 13 denotes a V/F adjuster; 13a denotes a summing point; 14 denotes a filter; 15 denotes an effective power computing unit; 17 denotes a comparator; 18 denotes a current setting unit; and 19 denotes a switch.

The main circuit 1 inverts a DC voltage to an AC voltage, and its output is shaped into a sinusoidal waveform by a filter comprising the AC reactor 2 and the capacitor 3. The transformer 4 is provided for output voltage matching. The current transformer 5 detects the output current of the inverter, and the potential transformer 6 detects the output voltage of the inverter. The output contactor 7 is turned on when the CVCF inverter starts operation.

A voltage control loop is formed comprising the pulse distributor 8, the voltage adjuster 9, the summing point 9a, the voltage setting unit 10, and the AC/DC converter 11. The voltage control loop functions as follows: First, the converter 11 AC-to-DC converts the output voltage of the potential transformer (PT) 6 so as to output a detected value corresponding to the output voltage of the inverter. The difference between the detected value and the output of the voltage setting unit 10 is inputted from the summing point 9a to the voltage adjuster 9. The voltage adjuster 9 carries out computation based on the difference, and outputs a control voltage. The pulse distributor 8 controls firing of the switching devices of the main circuit 1 in accordance with the control voltage so that the output voltage of the inverter is maintained at the voltage set by the voltage setting unit 10.

On the other hand, the output frequency of the inverter is controlled as follows. First, the AC/DC converter 16 detects the output current of the inverter, and outputs a detected value corresponding to the output current. The comparator 17 compares the detected value with the set value of the output current which is supplied from the current setting unit 18. When the detected value exceeds the set value, the switch 19 is turned on.

The effective power computing unit 15 computes the effective power component of the power which the inverter supplies to the power generator, or the inverter receives from the power generator, on the basis of the signals associated with the output voltage and current of the inverter supplied from the current transformer 5 and the potential transformer 6.

A frequency control loop is formed comprising the V/F oscillator 12, the V/F adjuster 13 and the filter 14. The V/F adjuster 13 supplies the V/F oscillator 12 with a signal that controls the frequency of the V/F oscillator 12 in such a manner that the effective power approaches zero as described before with reference to FIGS. 2 and 3. The output of the V/F adjuster 13 is supplied to the input of the filter 14 so as to be fed back to the input of the V/F adjuster 13 via the filter 14. This serves to prevent unstable operation due to hunting or the like.

With this arrangement, the inverter 1 outputs a constant voltage owing to the control of the voltage control loop, and operates at a constant frequency (a reference frequency) owing to the control of the frequency control loop as long as the output current of the inverter does not exceed the set value.

On the other hand, when the output current of the inverter exceeds the set value, the comparator closes the switch 19 so that the effective power component is supplied to the V/F adjuster 13 via the summing point 13a. The V/F adjuster 13 controls the reference frequency in accordance with the effective power component. Assuming that the effective power component is positive when the power is supplied from the power generator to the inverter, and is negative when the power is supplied from the inverter to the power generator, the reference frequency, that is, the output frequency of the inverter, is increased when the effective power component is positive, whereas it is decreased when the effective power component is negative. Thus, the phase difference between the inverter and the power generator is maintained within a fixed value so that the cross current is reduced.

EMBODIMENT 2

Figure 5:
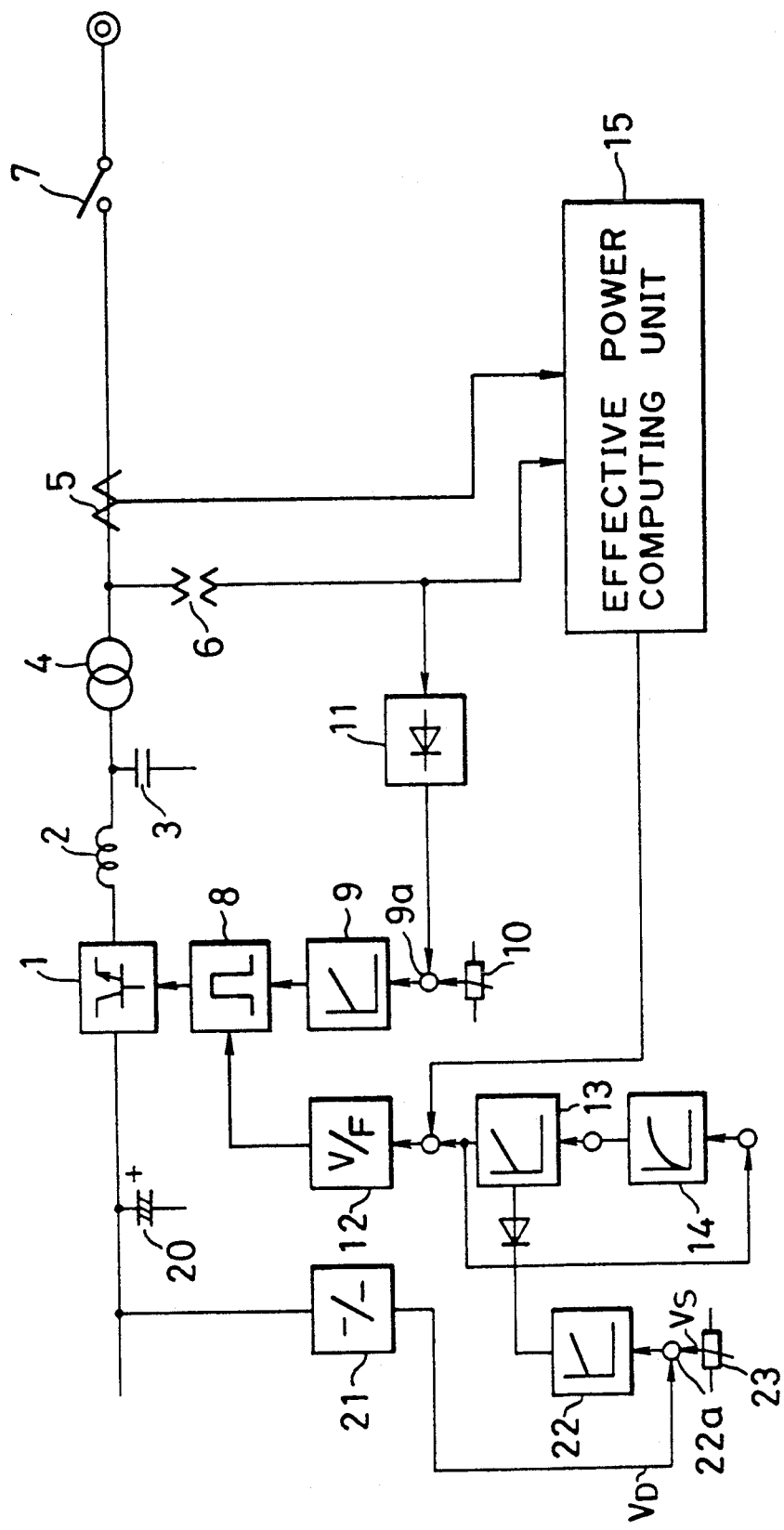
FIG. 5 is a block diagram showing the arrangement of a second embodiment of a CVCF inverter in accordance with the present invention.

FIG. 5 is a block diagram illustrating a second embodiment of a CVCF inverter in accordance with the present invention.

This embodiment is characterized in that a DC voltage detector 21, a DC voltage adjuster 22, a summing point 22a, and a DC voltage setting unit 23 are provided in addition to the arrangement of FIG. 4, and the AC/DC converter 16, the comparator 17, the current setting unit 18 and the switch 19 are removed therefrom.

The detector 21 detects the DC voltage across the capacitor 20. The detected voltage is inputted to the summing point 22a which outputs the difference between the detected voltage $V_D$ and the DC set voltage $V_S$ from the voltage setting unit 23. The output of the summing point 22a is fed to the DC voltage adjuster 22 which outputs a voltage proportional to the difference $V_D-V_S$. The output of the DC voltage adjuster 22 or that of the V/F adjuster 13 is fed to the V/F oscillator 12 in accordance with the following rule: if $V_D>V_S$, the output of the DC voltage adjuster 22 is supplied to the V/F oscillator 12; and if $V_D<V_S$ the output of the V/F adjuster 13 is applied to the V/F oscillator 12.

The normal control of this embodiment is performed so that the input level of the V/F adjuster 13 is adjusted to zero, and the output frequency of the inverter is regulated at 400 Hz, for example.

If the DC voltage of the inverter across the capacitor 20 increases and the voltage $V_D$ exceeds the reference voltage $V_S$, the output of the DC voltage adjuster 22 is supplied to the V/F oscillator 12 instead of the output of the V/F adjuster 13. Even if the cross current is less than a fixed value, the voltage across the capacitor 20 will gradually increase in accordance with equation (3). Thus, when the voltage of the capacitor 20 exceeds a predetermined threshold, that is, the voltage $V_D$ exceed $V_S$, the DC voltage adjuster 22 supplies the V/F oscillator 12 with the output so that the output frequency of the inverter will be increased in accordance with the difference $V_D-V_S$. If the DC voltage of the inverter drops again and the voltage $V_D$ becomes less than $V_S$ owing to the increase in the output frequency of the inverter, the control of the V/F oscillator 12 shifts from the DC voltage adjuster 22 to the V/F adjuster 13 again so that the output frequency of the inverter is maintained at 400 Hz. The operation is otherwise similar to that of FIG. 4.

Although the output of an effective power computing unit 15 similar to that of FIG. 4 is applied to the input of the V/F oscillator 12 for stabilizing the operation of the system, the effective power computing unit 15 can be omitted if stable operation is achieved without it.

EMBODIMENT 3

Figure 6:
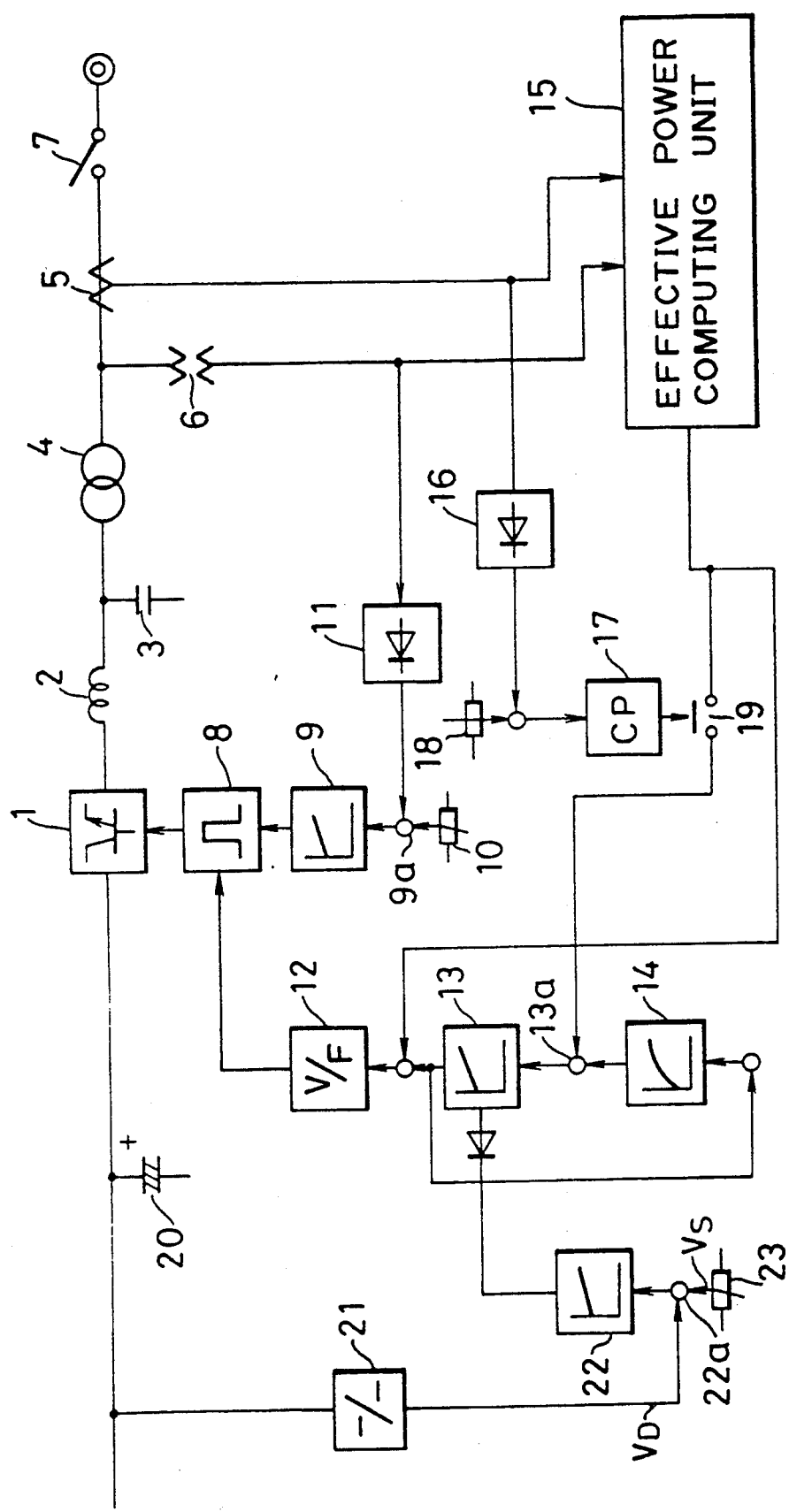
FIG. 6 is a block diagram showing the arrangement of a third embodiment of a CVCF inverter in accordance with the present invention.

FIG. 6 is a block diagram showing a third embodiment of a CVCF inverter in accordance with the present invention.

As will be seen from this figure, the third embodiment is arranged by combining the arrangements shown in FIGS. 4 and 5. Accordingly, the operation of this embodiment is a combination of these arrangements. More specifically, when the output current of the inverter exceeds a predetermined value, the comparator 17 closes the switch 19, and hence, the effective power component is supplied to the V/F adjuster 13. The V/F adjuster 13 increases or decreases the reference frequency in accordance with the effective power component so that the phase difference between the inverter and the power generator is maintained within a predetermined range. Thus, the cross current is reduced. In addition, when the voltage across the capacitor 20 exceeds the predetermined threshold, the DC voltage adjuster 22 has the V/F oscillator 12 operate to increase the output frequency. Thus, more stable and safe operation is achieved.

Although specific embodiments of a CVCF inverter and a method for controlling the same constructed in accordance with the present invention have been disclosed, it is not intended that the invention be restricted to either the specific configurations or the uses disclosed herein. Modifications may be made in a manner obvious to those skilled in the art. Accordingly, it is intended that the invention be limited only by the scope of the appended claims.

What is claimed is:

1. A constant voltage constant frequency inverter comprising:

main circuit means for converting a DC input voltage to an AC output voltage which has a frequency;

voltage control means for controlling the output voltage of said main circuit means;

frequency control means for controlling the frequency of the output voltage of said main circuit means so that the frequency is maintained at a reference frequency;

means for detecting the output voltage of said main circuit means;

means for detecting an output current of said main circuit means;

effective power computing means for computing effective power outputted from or inputted to said main circuit means based on the output voltage and the output current of said main circuit means; and adjusting means for reducing a cross current flowing through said main circuit means by adjusting the reference frequency in accordance with an output of said effective power computing means, said adjusting means increasing the reference frequency when the effective power is flowing into the main circuit means and decreasing the reference frequency when the effective power is flowing out of said main circuit means.

2. An inverter as claimed in claim 1, wherein said adjusting means further comprises comparing means for comparing the output current of said main circuit means with a predetermined value, and wherein said adjusting means changes the reference frequency in accordance with the magnitude of said effective power when the output current of said main circuit means exceeds the predetermined value.

3. An inverter as claimed in claim 2, wherein said adjusting means comprises voltage/frequency adjuster means for producing a voltage in accordance with the effective power, and said frequency control means comprises voltage/frequency oscillator means for generating a signal with an oscillating frequency which changes in response to the voltage outputted from said voltage/frequency adjuster means.

4. An inverter as claimed in claim 3, wherein said adjusting means further comprises filter means for filtering the output of said voltage/frequency adjuster means, and summing point means for producing a difference between the output of said filter means and the effective power and for supplying the difference to said voltage/frequency adjuster means.

5. A constant voltage constant frequency inverter comprising:
  main circuit means for converting a DC input voltage to an AC output voltage which has a frequency;
  voltage control means for controlling the output voltage of said main circuit means;
  frequency control means for controlling the frequency of the output voltage of said main circuit means so that the frequency is maintained at a reference frequency;
  input voltage detecting means for detecting the DC voltage inputted to said main circuit means; and
  adjusting means for reducing a cross current flowing through said main circuit means by adjusting the reference frequency in accordance with an output of said input voltage detecting means, said adjusting means including comparing means for comparing the detected DC voltage with a predetermined value, and voltage adjuster means for controlling said frequency control means so that the reference frequency is increased by an amount corresponding to the difference between the detected DC voltage and the predetermined value when the detected DC voltage exceeds the predetermined value.

6. An inverter as claimed in claim 5, further comprising means for detecting the output voltage of said main circuit means, means for detecting an output current of said main circuit means, and effective power computing means for computing effective power outputted from or inputted to said main circuit means based on the output voltage and the output current of said main circuit means, and wherein said adjusting means adjusts the reference frequency, when the detected DC voltage is less than the predetermined value, in such a manner that the reference frequency is decreased when the effective power is flowing out of the main circuit means and is increased when the effective power is flowing into said main circuit means.

7. An inverter as claimed in claim 6, wherein said adjusting means further comprises comparing means for comparing the output current of said main circuit means with a predetermined value, and wherein said adjusting means controls said frequency control means so that the reference frequency is changed in accordance with the magnitude of said effective power when the output current of said main circuit means exceeds the predetermined value.

8. An inverter as claimed in claim 7, wherein said adjusting means comprises voltage/frequency adjuster means for producing a voltage in accordance with the effective power, and said frequency control means comprises a voltage/frequency oscillator means for generating a signal with an oscillating frequency which changes in response to the voltage outputted from said voltage/frequency adjuster means.

9. An inverter as claimed in claim 8, wherein said adjusting means further comprises filter means for filtering the output of said voltage/frequency adjuster means, and summing point means for producing a difference between the output of said filter means and the effective power and supplying the difference to said voltage/frequency adjuster means.

10. A method for controlling a constant voltage constant frequency inverter having a main circuit for converting a DC input voltage to an AC output voltage which has a frequency, said method comprising the steps of:
  controlling the frequency of the output voltage of said main circuit so that the frequency is maintained at a reference frequency;
  detecting the output voltage of said main circuit;
  detecting an output current of said main circuit;
  computing effective power outputted from or inputted to said main circuit based on the output voltage and the output current of said main circuit; and
  adjusting the reference frequency in accordance with the effective power to reduce a cross current flowing through said main circuit, said step of adjusting including the steps of increasing the reference frequency when the effective power is flowing into the main circuit and decreasing the reference frequency when the effective power is flowing out of said main circuit.

11. A method for controlling an inverter as claimed in claim 10, wherein said step of adjusting comprises the steps of comparing the output current of said main circuit with a predetermined value, and adjusting the reference frequency in accordance with the magnitude of said effective power when the output current of said main circuit exceeds the predetermined value.

12. A method for controlling an inverter as claimed in claim 11, wherein said step of adjusting comprises the step of producing a voltage in accordance with the effective power, and said step of controlling comprises the step of changing the frequency of the output voltage of said main circuit in response to the voltage.

13. A method for controlling a constant voltage constant frequency inverter having a main circuit for converting a DC input voltage to an AC output voltage which has a frequency, said method comprising the steps of:
  controlling the frequency of the output voltage of said main circuit so that the frequency is maintained at a reference frequency;
  detecting the DC voltage inputted to said main circuit; and adjusting the reference frequency in accordance with the detected DC voltage to reduce a cross current flowing through said main circuit, said step of adjusting including the steps of comparing the detected DC voltage with a predetermined value, and increasing the reference frequency by an amount corresponding to the difference between the detected DC voltage and the predetermined value when the detected DC voltage exceeds the predetermined value.

14. A method for controlling an inverter as claimed in claim 13, comprising the steps of detecting the output voltage of said main circuit, detecting an output current of said main circuit, and computing effective power outputted from or inputted to said main circuit based on the output voltage and the output current of said main circuit, and wherein said step of adjusting comprises the step of adjusting the reference frequency, when the detected DC voltage is less than the predetermined value, in such a manner that the reference frequency is decreased when the effective power is flowing out of the main circuit, and is increased when the effective power is flowing into said main circuit.

15. A method for controlling an inverter as claimed in claim 14, wherein said step of adjusting comprises the steps of comparing the output current of said main circuit with a predetermined value, and controlling the reference frequency in accordance with the magnitude of said effective power when the output current of said main circuit exceeds the predetermined value.

16. A method for controlling an inverter as claimed in claim 15, wherein said step of adjusting comprises the step of producing a voltage in accordance with the effective power, and said step of controlling comprises the step of changing the frequency of the output voltage of said main circuit in response to the voltage.

* * * * *